United States Patent [19]

Nakanishi et al.

[11] Patent Number: 4,608,557

[45] Date of Patent: Aug. 26, 1986

[54] GRAPH-DRAWING MACHINE

[75] Inventors: Yasuhiro Nakanishi, Nara; Toshio Nishimura, Joyo, both of Japan

[73] Assignee: Sharp Kabushiki Kaisha, Osaka, Japan

[21] Appl. No.: 528,846

[22] Filed: Sep. 2, 1983

[30] Foreign Application Priority Data

Sep. 10, 1982 [JP] Japan .................................. 57-158393

[51] Int. Cl.$^4$ ............................................. G09G 3/00
[52] U.S. Cl. .................................. 340/715; 340/722; 340/753
[58] Field of Search ............... 340/721, 722, 715, 731, 340/753, 754; 364/518, 519, 520, 709, 710, 715

[56] References Cited

U.S. PATENT DOCUMENTS

| 3,811,040 | 5/1974 | Weinfurt | 340/722 |
| 4,236,151 | 11/1980 | Russ et al. | 340/722 |
| 4,251,769 | 2/1981 | Ewert et al. | 340/753 |
| 4,375,079 | 2/1983 | Ricketts et al. | 340/724 |

Primary Examiner—Gerald L. Brigance
Attorney, Agent, or Firm—Birch, Stewart, Kolasch & Birch

[57] ABSTRACT

A graph-drawing machine adapted to print and output numerical data in graph form when numerical data are inputted and a given graph-printing instruction is given. The maximum value or the minimum value of the scale is optionally set by the user in the drawing of the graph. The numerical data exceeding the maximum value or the minimum value are printed in a numeric format instead of being graphed. Incorrectly inputted data can be more easily identified because data which exceeds the present boundaries are printed in a numeric form.

4 Claims, 9 Drawing Figures

|← first →|← second →|

GRAPH-DRAWING MACHINE

BACKGROUND OF THE INVENTION

The present invention relates to a graph-drawing machine of electronic type, which is adapted to print numerical data in a graph when the numerical data are inputted and a graph-printing instruction is given.

Generally, in a graph-drawing machine which prints inputted numeric data in a graph, the maximum size of the graph to be printed is determined by the printing capacity of the output printer. In conventional graph-drawing machines, the maximum value of graph scale is determined so that all the input data might be graphed within the maximum output size of the printer. Accordingly, in graphing data mixed with improper values, which are extremely larger or smaller than the proper data, the proper data appears small and difficult to read, because the graph scale is adjusted to the improper data.

SUMMARY OF THE INVENTION

An object of the present invention is to solve such problems as described hereinabove in the conventional graph drawing machine.

Another object of the present invention is to provide a graph-drawing machine, capable of easy and proper setting of a maximum value or a minimum value of a scale in a graphing of the data mixed with improper values.

A further object of the present invention is to provide a graph-drawing machine, which can provide a graph partially enlarged or the freely reduced.

According to the present invention, a graph-drawing machine adapted to print inputted numerical data in a graph when the numerical data are inputted and a graph-printing instruction is actuated. The graph printing instruction can optionally set a maximum value or a minimum value of a scale in the drawing operation of a graph having the scale axis of the rod graph, the line graph and the like. The numerical data can be adapted to be printed, instead of graphed, when numerical data exceeds the boundaries set by the maximum or minimum values input.

These and other objects, features aspects and advantages of the present invention will become more apparent from the following detailed description of the present invention when taken in conjunction with the accompanying drawings.

DESCRIPTION OF THE PREFERRED EMBODIMENTS

Figure 1:
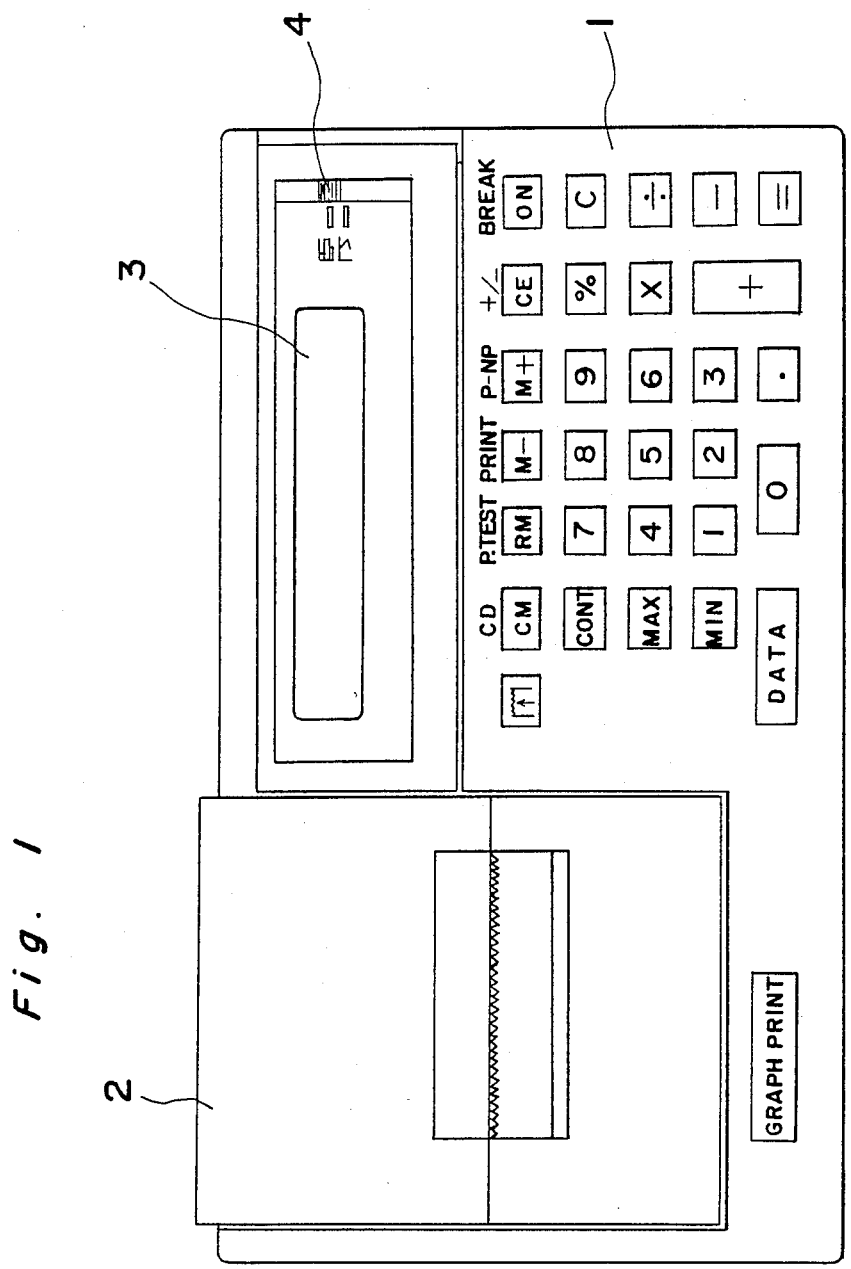
FIG. 1 is a plane view showing the appearance of a graph-drawing machine in one embodiment of the present invention.

FIG. 1, shows a graph-drawing machine, in one embodiment of the present invention, including a key input unit 1 for inputting numerical data and a graph instruction, a printer unit 2 for graphing and outputting inputted numerical data, a display unit (LCD) 3, and slide switches 4 for selecting graph types.

Figure 2:
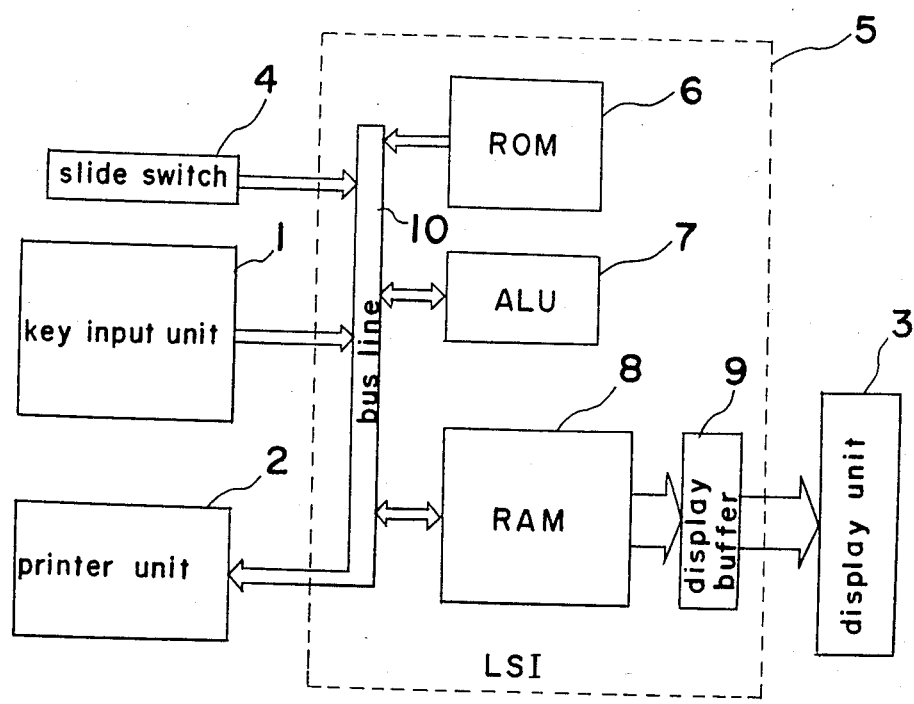
FIG. 2 is a block diagram showing the schematic construction of the embodiment of FIG. 1.

FIG. 2, shows a control unit 5 accommodated within the graph-drawing machine and connected with the key input unit 1, printer unit 2, display unit 3 and slide switches 4. The control unit is a LSI (larger scale integration), whose main components are a ROM 6, ALU 7, and a RAM 8. Each unit 6, 7, and 8 transfers the data through a bus line 10 which is connects each unit with the key input unit 1, printer unit 2 and slide switches 4. Provided between the RAM 8 and the display unit 3 is a display buffer 9 for driving the display unit 3.

Figure 3A:
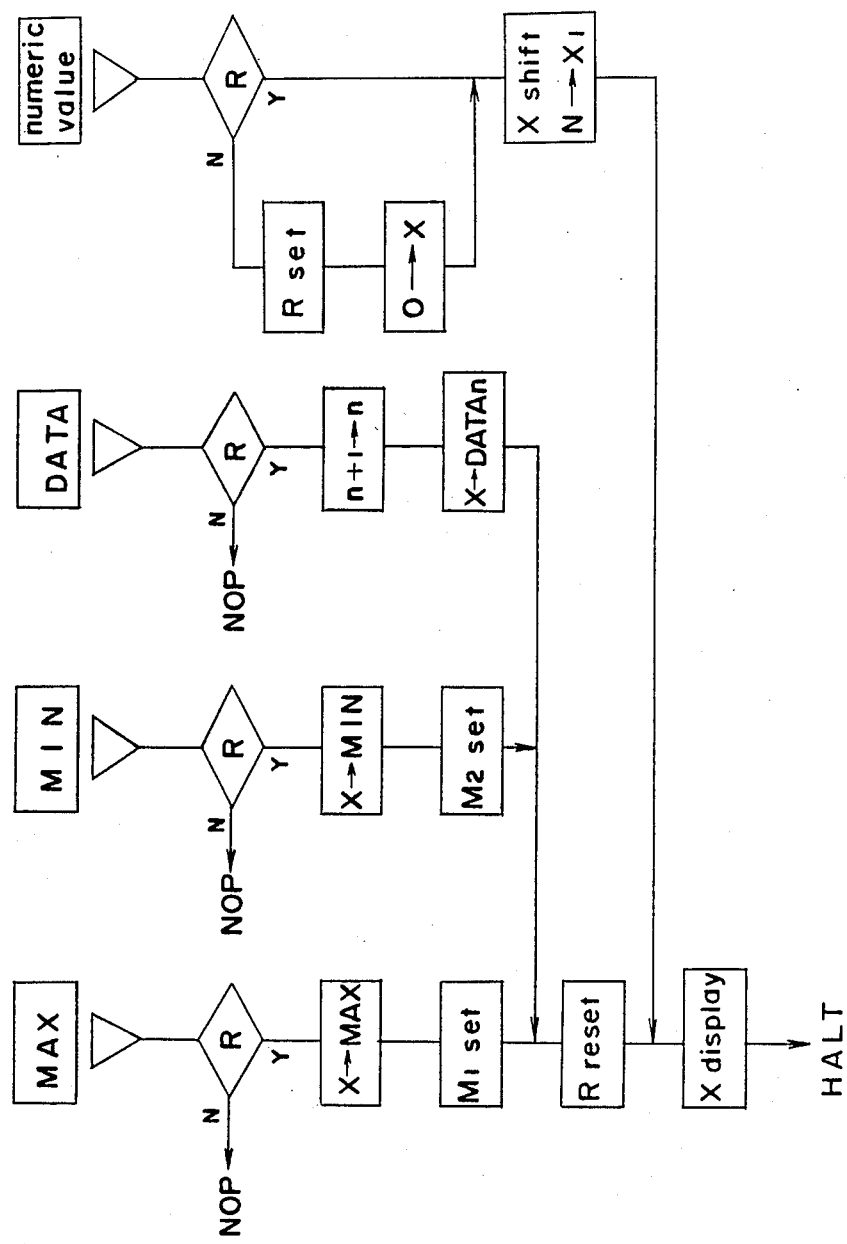
FIGS. 3(a) and 3(b) considered in combination show a flow chart for illustrating the operation of the same embodiment.

The detailed operation of the above machine will be given hereinafter, by way of drawing a rod graph, in conjunction with the flow chart of FIGS. 3(a) and 3(b).

With the above machine, the numerical data are inputted by numeric keys such as [0],..., [9], [.], upon actuation of the data input key [DATA] (hereinafter referred to as "DATA key"). In the first numerical key action, the input numerical value (N) is inputted into a least significant digit ($X_1$) of the display register X after the flag R has been set and the display register (X) has been cleared. By the second and subsequent numerical key actions, the contents of (X) are shifted by one digit towards the most significant digit and thereafter the inputted numerical values are inputted into the least significant digit ($X_1$) of the (X). The flag R remains set. Upon activation of DATA key after the first numerical data has been inputted, the above-described data within the display register (X) is stored in a first digit data region (DATA 1) of the RAM 8. Thereafter, the flag R is reset.

Upon activation of DATA key after a second numerical data has been inputted, the second data is stored in the second data region (DATA 2) of the RAM 8.

In the same manner as described hereinabove, each data from the third to the twelfth is stored respectively in the third region (DATA 3) to the twelfth region (DATA 12) of the RAM 8.

To draw a graph, the maximum value of the graph scale is determined so that all the inputted numerical data may be graphed* through depression of the graph print instruction key [GRAPH PRINT] (hereinafter referred to as "GRAPH PRINT key") immediately after the numerical value data has been inputted.

It is to be noted that a novel characteristic of the present invention resides in that the maximum value or/and the minimum value of the scale can be optionally set by the user.

For instance, upon activation of the maximum-value key [MAX] (hereinafter referred to as "MAX key") and after the user has inputted the numerical value he specifies as a maximum value, the numerical value is stored in the maximum value storing region (MAX) of the RAM 8 and a flag $M_1$ showing that the maximum value has been specified is set.

Also, the minimum value is specified in the same manner. Namely, upon activation of the minimum-value key [MIN] (hereinafter referred to as "MIN key") and after the minimum value has been inputted, the above-described minimum value is stored in the minimum-value storing region (MIN) of the RAM 8, and a flag $M_2$ showing that the minimum value has been specified is set.

Figure 3B:
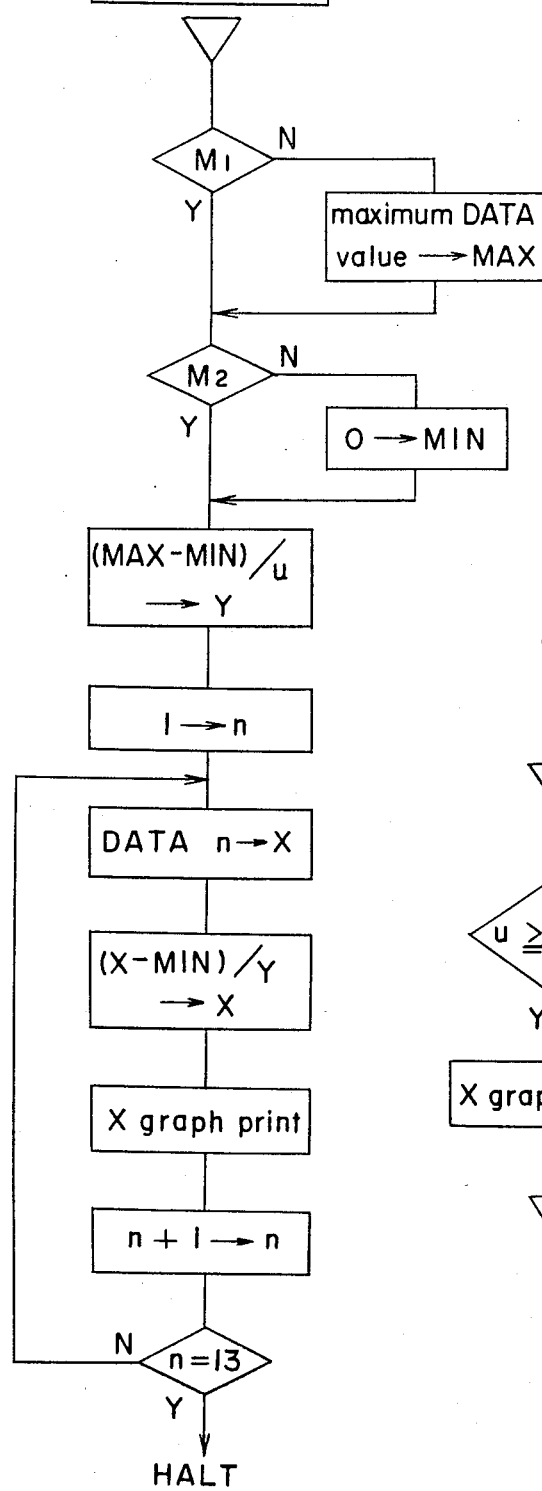

As illustrated in FIG. 3(b), when GRAPH PRINT key is depressed, the flag $M_1$ is judged. If the flag $M_1$ is set, namely, when the maximum value is specified, the next flag $M_2$ is judged. However, when the flag $M_1$ is reset, the maximum data among the inputted numeric data is stored in the MAX and, thereafter, the flag $M_2$ is judged. In the same manner, when the judge of the flag $M_2$ shows that the flag $M_1$ is reset, "0" is stored in the MIN.

Figure 5:
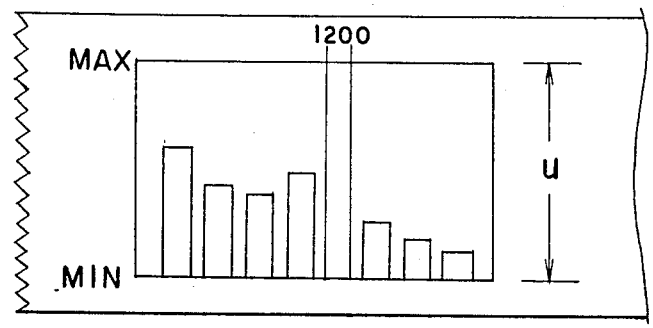
FIG. 5 through FIG. 7 are graph print examples in the same embodiment.

Then, the operation of the (MAX-MIN)/U is effected, and the result is stored in the operation register (Y). As shown in FIG. 5, the above-described "U" represents a numerical value indicating in the minimum printing unit of the printer, the width of the region to be used for the graph print on the printing paper. For example, the numerical value of "U" is equivalent to the number of dots in a dot printer.

Then, the data stored in a first (DATA 1) of the data region of the RAM 8 is transferred to and displayed in the register (X). Thereafter, the value of the (X-MIN)/Y is obtained based upon the contents of (X). The above-described operation obtains the value of (X-MIN) this value being the minimum printing unit for the printer when the value of the (MAX-MIN) has been made equivalent to "U". Accordingly, the given graph printing operation is performed in accordance with the value obtained by the operation.

In the same manner, the graph printing operation is performed in accordance with each of the numerical data from a second region (DATA 2) to a twelfth region (DATA 12).

Figure 4:
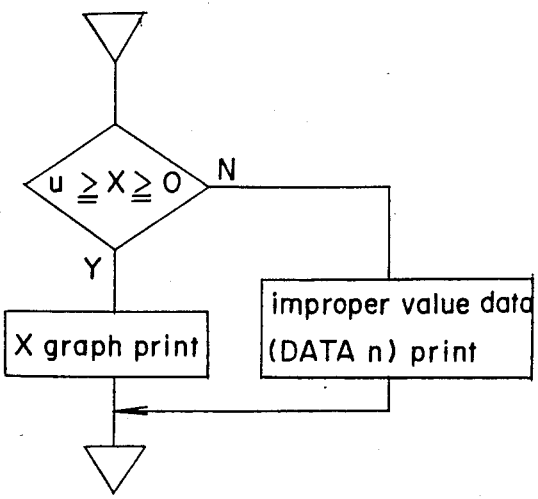
FIG. 4 is a flow chart showing details of the "X graph print" routine in FIG. 3.
Figure 6:
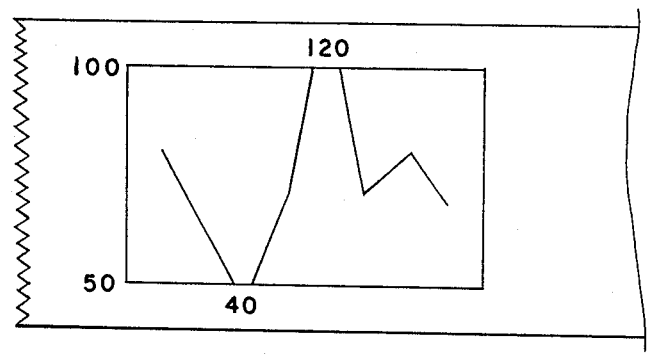

Referring to FIG. 4 of a flow chart showing the "X graph print" routine of FIG. 3, when the value obtained by the operation of the "(X-MIN)/Y→X" is between the "U" and "0", the printing operation of the rod graph of the height to be determined by the value is effected. On the other hand, as shown in FIG. 5, when the value of the operation "(X-MIN)/Y→" is larger than the "U", the graphing is not finished and the DATA n is printed in the top portion of the graph. Also, when the value of the operation "(X-MIN)/Y→X" smaller than the "0", the graph printing operation is not performed at all and only the printing of the DATA n is given under the graph. Although FIG. 5 is the output graph example in the case of the rod graph, in the case of the line graph, for example, the graph shown in FIG. 6 is outputted.

The inputted data are adapted and retained unless a clearing operation is performed. Therefore, the same graph can be printed and outputted repeatedly by the activation of the GRAPH PRINT key.

In addition, the graph drawing machine of the present embodiment not only can print graphs, but also can also used as an electronic calculator. Upon activation of the DATA key after the desired calculation has been performed, the calculated result is stored in the n th data region of the RAM 8 and is provided in the display register (X) of the machine.

Furthermore, in the present embodiment, an input buffer is provided, which allows the inputting operation to be performed even during the graph printing operation. To draw a plurality of same graph, first, keep the key in a depressed position. This instructs the outputting operation of the plurality of graphs, and the plurality of graphs to sequentially draw the plurality of graphs. Thus, the complicated operation as existed in conventional graph drawing machine is unnecessary.

Figure 7:
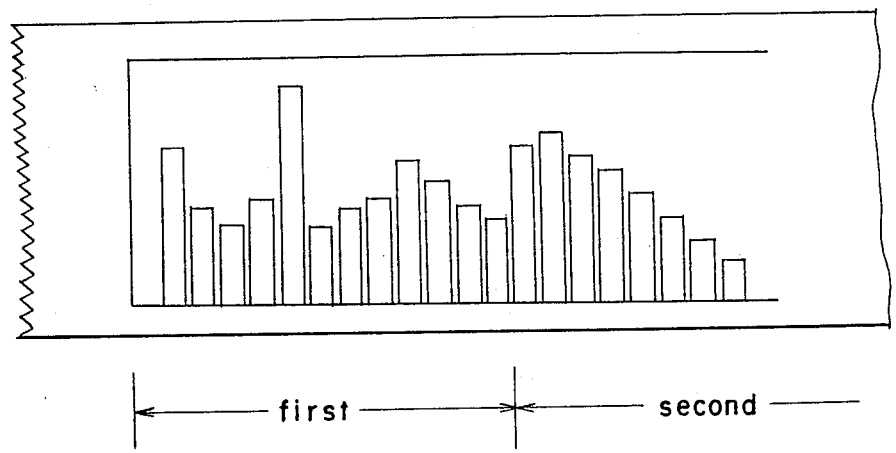

Also, the continuous key [CONT] (hereinafter referred to as CONT key) can switch the graph output mode from a common mode to a continuous mode, or from the continuous mode to the switching operation for switching is alternately effected for each operation. If the continuous mode is set, the graph can be printed as one graph even when the number of data is larger than the number of digits provided in the data region of the RAM 8 as shown in FIG. 7.

Figure 8:
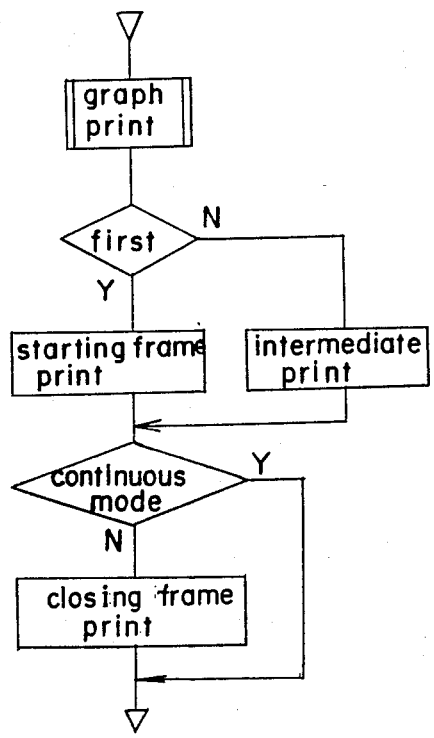
FIG. 8 is a flow chart showing details of the "X graph print" operation in FIG. 3.

As shown in the flow chart of FIG. 8, an initiating frame ( [ ) is printed after the graph of the data of the first unit of data has been completed. Thereafter, it is judged whether or not the continuous mode is specified. If it is the continuous mode actuated, the closing frame (]) is not printed and an intermediate frame (═) is printed.

Then, if the user actuates the CONT key action again, before the GRAPH PRINT key is depressed after the last unit of data has been inputted, and after the graph printing operation of the last unit of data has been completed, the intermediate frame and the closing frame (]) are printed thus completing the printing operation of the graph consisting of the initiating, intermediate and closing frames ([═]).

As described fully hereinabove, according to the graph-drawing machine of the present invention, the maximum value or the minimum value of the scale is adapted to be optionally set by the user in the drawing of the graph having the scale axes of the rod graph, the line graph, etc. The numerical data exceeding the maximum value or the numeric data which are smaller than the minimum value are adapted to be printed, instead of being graphed. According to the present invention, even if proper data is mixed with improper data, the printed graphs provided an easier way to and detect of improper values based upon the proper setting of the maximum value or the minimum value of the scale. In addition, the entire graph can be partially enlarged or freely reduced. The graph-drawing machine is extremely effective in the expression and analysis of the data.

Although the present invention has fully been described in connection with the preferred embodiment thereof with reference to the accompanying drawings, it is to be noted that various changes and modifications are apparent to those skilled in the art. Such changes and modifications are to be understood as included within the scope of this invention unless they depart therefrom.

What is claimed is:

1. A graph drawing machine for producing a graph from inputted numerical data, comprising:
   key input means for inputting numerical data and control commands;
   control means responsive to said key input means for storing and processing the numerical data in preparation for producing a graph according to inputted control commands on a record medium, said control means including
   first memory means for storing numerical data input by the key input means;
   second memory means for storing control command programs and machine function programs;
   preset means for designating a preset top and bottom margin for graphing the inputted numerical data on said record medium, said top and bottom margins corresponding to maximum and minimum values, respectively, of said numerical data;

graphing means responsive to the key input means and the preset means for producing a graph from the inputted numerical data in which numerical data exceeding the preset values are printed in numerical form outside of said margins and not graphed;

printer means responsive to said control means and said preset means for printing a graph and said numerical data exceeding said preset values on said record medium; and display means responsive to said key input means and said control means for displaying any of said numerical data.

2. A graph drawing machine, as recited in claim 1, wherein said control means further comprises a graph mode selection means connected to the key input means and graphing means for selecting a multiplicity of various graph formats for outputting the numerical data.

3. A graph drawing machine, as recited in claim 1, wherein said control means further comprises a graph continuation means responsive to said key input means and connected to said printer means for producing a continuous graph from a multiplicity of independent groups of inputted data.

4. A graph drawing machine, as recited in claim 1, wherein said control means further comprises a calculator means responsive to said key input means for internally processing numerical data.

* * * * *